Sept. 27, 1966  B. N. SVENSON  3,275,185
CLAMPING APPARATUS
Filed Oct. 29, 1964  2 Sheets-Sheet 2
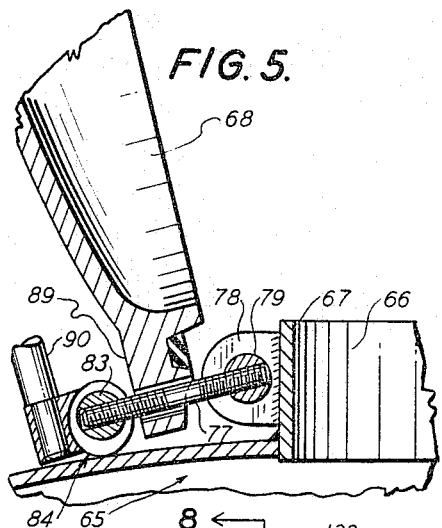
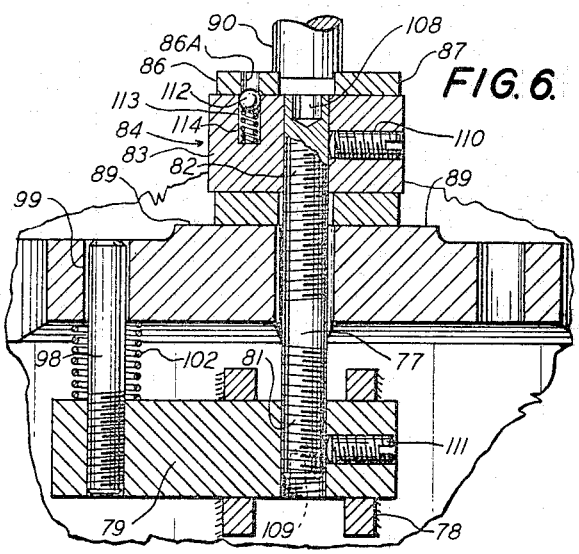
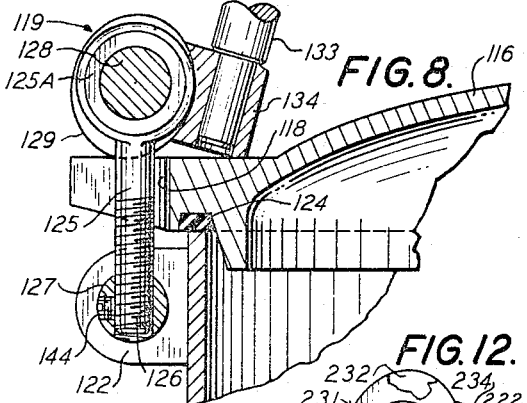
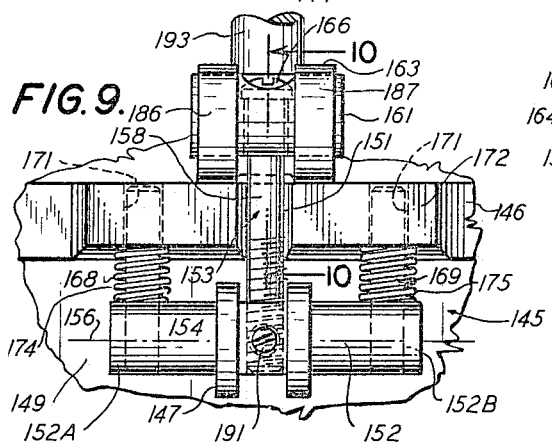
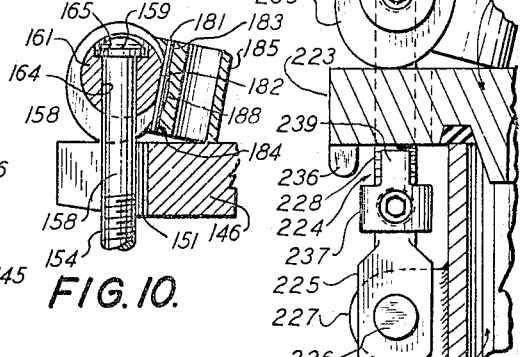
INVENTOR.
BERT N. SVENSON
BY
W. J. Gribble
ATTORNEY

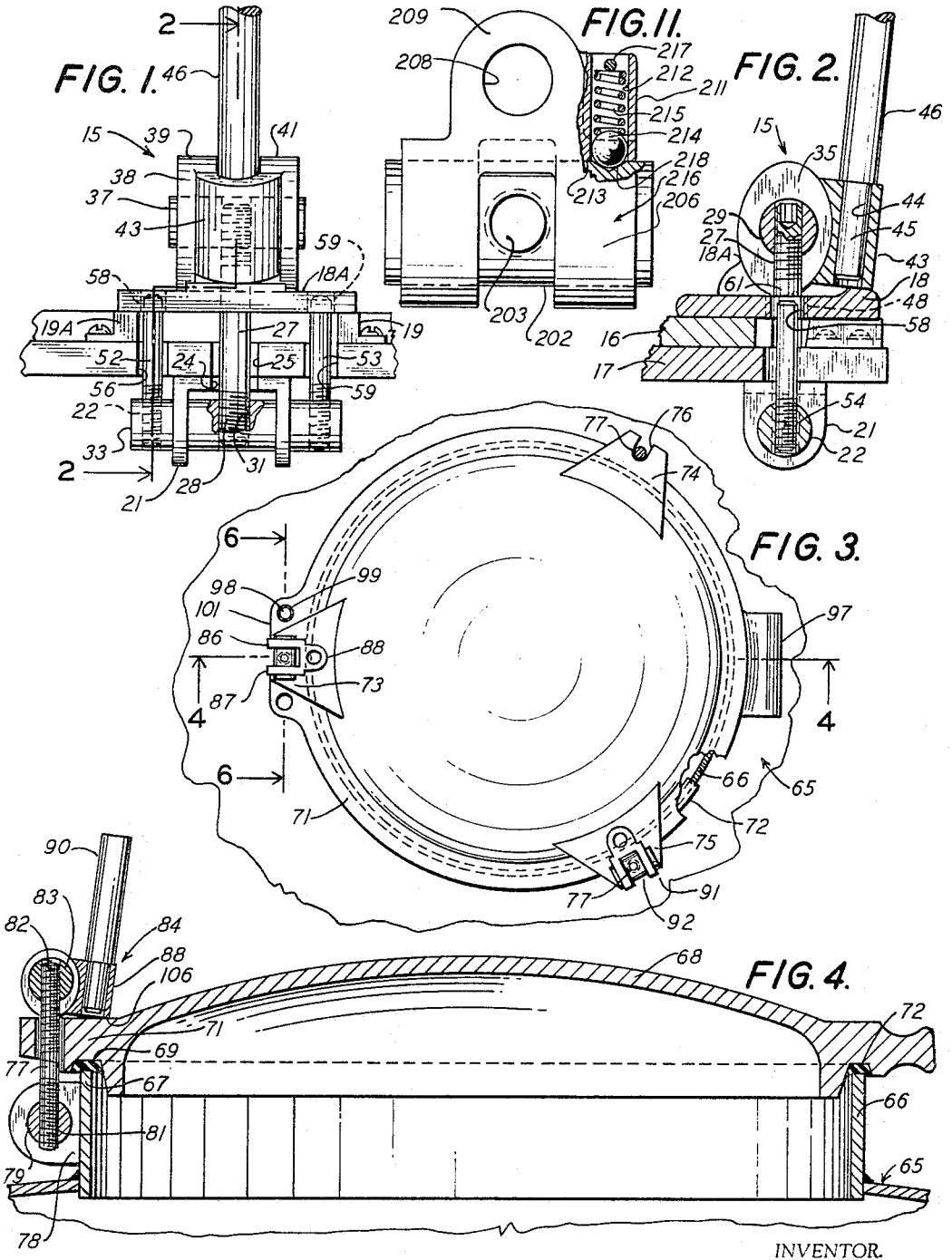

United States Patent Office 3,275,185
Patented Sept. 27, 1966

3,275,185
CLAMPING APPARATUS
Bert N. Svenson, 10747 Spry St., Norwalk, Calif.
Filed Oct. 29, 1964, Ser. No. 407,439
18 Claims. (Cl. 220—55)

The invention relates to clamping apparatus and more particularly to adjustable overcenter cam clamps adapted to clamp a workpiece against a work rest.

A wide variety of clamps is available to users desiring to hold down work being processed or to clamp a cover to a pressure vessel so that the closed vessel is sealed. In the case of vessels, the clamps are conventionally used in pluralities and spaced an equal distance apart around the cover of the vessel. Work-holding clamps may be used singly or in pluralities, depending upon the size of the workpiece. In many cases with both pressure vessel covers and workpiece holders it may be desirable to have a hinge about which the clamp for the workpiece or the pressure vessel cover can swing when the clamp or clamps are loose. Normally, adjusting the clamping pressure is imperative. I have invented apparatus including an adjustable clamp which imposes a hinging motion upon the workpiece clamp strip or cover such that the piece upon which the clamp bears is constrained to move with the clamp assembly away from the work rest or pressure vessel. The inventive apparatus thus precludes the necessity of a separate hinge mechanism.

The invention contemplates adjustable clamping apparatus for clamping a workpiece to a work rest and comprises a threaded arbor bolt, means securing the threaded arbor bolt in pivot relationship to the work rest and a cam arbor secured to the arbor bolt. The cam arbor journals a clamping cam adapted to bear against the workpiece and urge it into clamping relationship with the work rest. The clamping cam may include handle means adapted to turn the cam about the arbor. Means for achieving relative rotation between the threaded arbor bolt and the cam arbor and securing means is part of the combination. The cam arbor may thus be displaced relative to the means securing the bolt to the work rest to adjust clamping pressure. The securing means pivotally mounts the arbor bolt for arcuate motion toward and away from the work rest. Workpiece restraining means on the securing means or on the arbor bolt connects between the workpiece and the securing means such that the workpiece hinges away from the work rest along with the arbor bolt, cam arbor and clamping cam. Preferably so-called "lost motion" means used in conjunction with the restraining means afford smooth movement of the workpiece in and out of clamping position.

The arbor bolt may have many forms, particularly where the workpiece is a pressure vessel cover and the work rest a pressure vessel having an opening. The arbor bolt may comprise an eye bolt threaded at one end. The threaded end may be engaged either with the securing means or with the cam arbor. Alternatively, the arbor bolt may comprise a bolt threaded at one end for adjustable engagement with the securing means and having an opposite end adapted for engagement with the cam arbor in rotatable relationship therewith. The clamping cam may have one or two lobes. Each lobe may have a single locking cam surface, or have opposed cam surfaces of differing radial projection such as set forth in my copending application, Serial No. 385,391, filed July 27, 1964, and entitled "Adjustable Clamp." The preferred embodiment of the invention comprises an arbor bolt having a first and a second threaded end in which the threads are of opposite hands, that is, the thread helix of one end spirals oppositely to the thread helix of the other end of the arbor bolt. The preferred arbor bolt is threadably engaged with both the securing means, which may be a pivot pin and mounts, and the cam arbor. Turning means, such as a wrench socket, may be contained in either end of the preferred arbor bolt. When the arbor bolt is rotated, quick relative displacement of the securing means and the cam arbor is effected. The distance between the cam arbor and the securing means may be adjusted in any increment to change the compression loading that the clamping cam exerts against the pressure vessel cover or other workpiece when in clamping position.

A preferred embodiment of the invention also includes restraining means opposing accidental relative rotation between the clamping cam and the cam arbor. The restraining means may be a ball and spring detent mechanism or other friction devices imposing a restraint upon relative motion of the cam and the cam arbor.

The inventive apparatus affords an adjustable cam clamp which may act as a hinge without interference with its clamping function. The cam clamp resists accidental displacement and may be fabricated from materials and by techniques readily available in conventional manufacturing establishments. These and other advantages of the invention are apparent from the following detailed description and drawing wherein:

FIG. 1 is a fragmentary elevational view of a workpiece holding clamp in accordance with the invention;

FIG. 2 is a fragmentary sectional elevation taken along line 2—2 of FIG. 1;

FIG. 3 is a fragmentary plan view of a pressure vessel having clamping apparatus in accordance with the invention;

FIG. 4 is a fragmentary sectional elevation to a larger scale taken along line 4—4 of FIG. 3;

FIG. 5 is a fragmentary sectional elevation showing the cover in open position;

FIG. 6 is a fragmentary elevational view to a larger scale taken along line 6—6 of FIG. 3, showing rotation-restraining means details;

FIG. 7 is a fragmentary side elevation illustrating an alternate embodiment of the invention;

FIG. 8 is a fragmentary sectional elevation taken along line 8—8 of FIG. 7;

FIG. 9 is a fragmentary sectional elevation illustrating a further alternate embodiment of the invention;

FIG. 10 is a fragmentary sectional view taken along line 10—10 of FIG. 9 illustrating a spring detent;

FIG. 11 is a fragmentary plan view partly in section, illustrating an alternate detent embodiment; and FIG. 12 is a sectional view of a further alternate embodiment.

In FIGS. 1 and 2 a clamp assembly 15 secures a sheet of material 16 to a work rest 17. The work rest may be a work bench and the sheet of material is held in place for drilling, trimming or other fabrication steps. A workpiece or clamping strip 18 bears upon the work material 16 at one of its ends and rests at its other end upon L-shaped platforms 19, 19A that are removably secured to the work rest. A channel bracket 21 fixed to the bottom of the work rest journals a pivot pin 22. The channel bracket and the work rest have vertically aligned slots 24, 25, respectively, through which an arbor bolt 27 extends vertically.

Arbor bolt 27 has a first threaded portion 28 at its lower end and a second threaded portion 29 at its upper end. Portion 28 is engaged with a threaded bore 31 extending through pivot pin 22 perpendicularly to a pivot axis 33 of the pin.

The first and second threaded portions of the arbor bolt are of opposite hand. The first threaded portion has a left-hand, and the second threaded portion 29 a right-hand, thread. Either or both of the arbor bolt ends may have a hexagonal socket, such as the socket 35 shown in FIG. 2, for a conventional socket or Allen wrench.

A cylindrical cam arbor 37 has a transverse threaded bore 37A threadably engaged with portion 29 of the arbor bolt. Normally the cam arbor extends parallel to pivot pin 22. A clamping cam 38 having spaced identical cam lobes 39, 41 is journalled upon the cam arbor to revolve thereabout. A yoke 43 makes the cam lobes unitary. Yoke 43 also contains a handle recess 44 into which a reduced diameter end 45 of a clamp handle 46 is seated. Preferably handle 46 may be removed from the clamping cam once clamping or unclamping is achieved.

The lobes of the cam in clamping position bear upon an upper surface 18A of the clamping strip on either side of a central aperture 48 shown in dotted line in FIG. 2. The arbor bolt extends through the aperture between the pivot pin and the cam arbor. Conventionally aperature 48 is a slot extending to the outer edge of the clamping strip such that the clamping cam and the arbor bolt may, when pivoted about the axis of pin 22, swing in an arc away from material 16. However, in the embodiment of FIGS. 1 and 2 restraining means associated with the pivot pin move the clamping strip or workpiece as the cam clamp is swung outwardly away from the work rest. The restraining means comprises a pair of parallel spaced rods 51, 52 that are secured to the pivot pin by convenient means, such as thread 54. The pins extend upwardly through slots 56, 57 in the work rest into holes 58, 59 in the clamping strip.

In use, handle 46 is utilized to turn the cam lobes about the cam arbor. Such rotation moves the high point 61 of the cam lobes into clamping relationship against the clamping strip—securing work material 16 to the work rest. When the handle is again moved to unclamp the pieces the entire cam clamp assembly may be swung outwardly about pivot pin 22 to release the work material. Outward motion of the clamping cam is transmitted to the pivot pin through arbor bolt 27. As the pin is thus caused to rotate rods 52, 53 exert an outward force on the clamping strip, as does the arbor bolt itself. If desired, springs (not shown) may lodge about the rods to maintain the vertical spacing between the clamping strip and the pivot pin.

Returning the clamping cam to clamping position above the work rest returns the clamping strip to bear against another work material. The rods maintain the clamping strip in proper orientation.

In FIGS. 3–6 the apparatus of the invention is embodied in clamping means for a pressure vessel closure. A pressure vessel 65 has a cylindrical opening collar 66 with a substantially circular top opening 67. A domed vessel cover 68 resides across the opening. An annular groove 69 in a rim 71 of the cover seats a gasket 72 which effectively seals between the cover and the collar. As seen in FIG. 3, three equally spaced bearing tabs 73, 74, 75 project from the rim both outwardly and upwardly. Each tab has a vertical aperture such as the slot 76 of tab 74. A threaded arbor bolt 77 extends upwardly through each slot from securing means such as a protruding bracket 78 and a pivot pin 79. The bracket is fixed to the vessel collar 66. Arbor bolt 77 has oppositely threaded portions 81, 82 at its ends. Lower portion 81 is threadably engaged in pivot pin 79. Threaded portion 82 is threadably engeged with a cam arbor 83 which journals a clamping cam 84. The clamping cam is similar to the one described with respect to the embodiment of FIG. 1, having separated cam lobes 86, 87 and a yoke 88. The lobes register against a bearing surface 89 on each side of the tab apertures 76. A handle 90 is removably lodged in the yoke.

A similar clamping cam 91 is secured to a cam arbor 92 engaged with an arbor bolt 77 associated with bearing tab 75. A similar clamping cam (not shown) may be associated with tab 74. Arbor bolt 77 of tab 74 has been broken away to show more clearly the configuration of the tab.

Diametrically opposite tab 73 on the cover is a cover handle 97. The handle is adapted to lift the cover away from the cover opening on a hinge line parallel to the axis of rotation of pivot pin 79. However, the inventive combination disclosed in the embodiment of FIG 3 requires no separate hinge mechanism. A restraining rod 98 is threadably engaged in an end of the pivot pin (see FIG. 6) and extends upwardly to engage in a hole 99 extending vertically through a secondary lip 101 extending on either side of tab 73. A compression spring 102 extends between pivot pin 79 and the underside of lip 101. The spring biases the cover away from the opening to free the cover to swing away from the vessel.

As in the manner described with respect to the embodiment of FIG. 1, handle 89 is manipulated in order to bring the cam lobes into clamping relationship with the upper surfaces 104 of tab 73. When the cam lobes are in the locked, over-center position shown in FIG. 3, the cover is securely locked by the particular clamping cam. A corner 106 of yoke 88 lodges against the cover to prevent the over-center position from being exceeded. In the unclamped condition, as shown in FIG. 5, handle 89 has turned the clamping cam out of contact with the cover, and the arbor bolt and the clamping cam have been swung in an arc about pivot pin 79 away from the pressure vessel. Because rod 98 is engaged in cover hole 99, cover 68 is also moved in relationship to the pressure vessel to which the pivot pin is secured. Of course, the other clamping cams of the pressure vessel must be unclamped and moved from their respective bearing tabs before the cover may be hinged in the manner described.

Wrench sockets 108, 109 at either end of the arbor bolt provide for adjustment of clamping pressure. Since the arbor bolt threadably engages both the pivot pin and the cam arbor, sensitive adjustment of any degree may be quickly made. The right and left hand threads result in a full thread lead displacement of the vertical distance between cam arbor and pivot pin for each half revolution of the arbor bolt. Each of the clamping cams may be so adjusted to the desired clamping pressure. Soft pointed set screws 110, 111 threadably engaged in the cam arbor and the pivot pin respectively bear against the arbor bolt to fix the relationship once adjustment is made.

FIG. 6 illustrates in detail means for inhibiting cam rotation from locking position. A detent ball 112 projects from an arbor radial hole 113 under urging of a compression spring 114. When the cam is in locked position, the ball registers in a bore 86A drilled radially through cam lobe 86. The spring loading is such that five pounds or more of thrust is necessary to dislodge the ball from bore 86A and free the cam from fixed relationship to the cam arbor.

The spring and the ball are assembled into the cam arbor before the arbor and clamping cam are finally assembled.

The embodiment of FIGS. 3–6 therefore affords sensitive and quick adjustment of clamping pressure in combination with apparatus eliminating the need of a separate fixed hinge mount. Full exposure of the vessel opening can be achieved as shown by the position of the cover in FIG. 5. The arbor bolt and restraining rod tend to hold the cover in proper orientation for restoration to sealed position, as the handle manipulates the cover from open to closed position.

An alternate embodiment of the invention is illustrated in FIGS. 7 and 8. In those figures a pressure vessel 115 having a cover 116 whose rim 117 has a plurality of equally spaced slots, such as the slot 118, has a plurality of adjustable cam assemblies, such as the assembly 119, securing the cover in sealing relationship to the vessel. A plurality of pairs of spaced bracket ears 121, 122 is secured to the vessel wall 123. Bracket pairs are spaced about the vessel such that they align vertically with slots 118 in the cover when the cover is in sealing position. As in the previous pressure vessel embodiment, a conventional gasket 124 may intervene between the vessel opening rim and the cover.

Clamp assembly 119 is preferably an over-center acting cam clamp having oppositely disposed bearing surfaces on each lobe of the cam. Such a clamp is disclosed in my previously noted copending patent application, Serial No. 385,391, filed July 27, 1964, and entitled "Adjustable Clamp." The clamp of FIGS. 7 and 8 has an arbor bolt 125 adjustably and threadably engaged in a threaded bore 126 of a pivot pin 127 journalled in bracket ears 121, 122. The arbor bolt is capable of motion in slot 118 arcuately away from cover 116. An eye 125A of arbor bolt 125 encircles a cam arbor 128 upon which cam lobes 129, 131 of clamping assembly 119 are supported.

A conventional handle 133 removably engaged with a yoke 134 which joins the cam lobes is used to manipulate the cam lobes about the cam arbor axis, which is perpendicular to the arbor bolt.

Cover 116 has spaced apertures 136, 137 on either side of slot 118. Restraining rods 138, 139 engage the cover at the apertures. The opposite ends of both of the rods are secured in pivot pin 127. When the clamping cam is released from clamping position and the cam assembly swung outwardly in slot 118 to release the cover, restraining rods 138, 139 impel the cover away from the pressure vessel in hinge fashion about the rotation axis of pivot pin 127. Apertures 136, 137 allow some movement of the rods before they engage the cover so that compression springs 141, 142 about rods 138, 139, respectively, may ease the hinge motion by lifting the gasket of the cover out of contact with the opening rim. The rods also maintain the proper orientation of the cover to the pivot pin to make cover restoration simple.

The clamping compression of the embodiment shown in FIGS. 7 and 8 may be adjusted when the cam assembly is in unclamped position by turning the cam assembly about the vertical axis of arbor bolt 125. While the cam arbor is free to rotate within the loop of the eye bolt along its rotation axis, rotation in a horizontal plane causes the arbor bolt to turn within pivot pin 127 and change the vertical distance between the pivot pin and the axis of rotation of the arbor. A set screw 144 threadably engaged with the pivot pin locks the arbor bolt once proper adjustment is achieved.

As in previous embodiments, the apparatus of FIGS. 7 and 8 has the advantage of quick adjustment and elimination of separate hinge apparatus. These advantages are also inherent in the further alternate embodiment of the invention illustrated in FIG. 9.

A pressure vessel 145 having a cover 146 supports a plurality of pairs of bracket ears like ears 147, 148 fixed exteriorly to vessel wall 149. The cover rim has a plurality of peripheral apertures like slot 151. An elongate pivot pin 152 is journalled in each bracket pair. An arbor bolt 153 extends from each pin 152 through each slot 151 when the cover is in sealing relationship to an opening of the pressure vessel. Each arbor bolt has a threaded end 154 threadably and adjustably engaged centrally of pivot pin 152. The arbor bolt extends perpendicularly to an axis of rotation 156 of the pivot pin.

The opposite end of the arbor bolt has a smooth shank 158 and a protruding head 159. The head engages a cam arbor 161 that supports a clamping cam assembly 163 similar to that shown and described with respect to the embodiment of FIG. 3. The cam arbor has a bore 164 extending centrally through the arbor at right angles to the axis of rotation of the arbor. The bore is slightly greater than the diameter of arbor bolt shank 158. A counterbored recess 165 seats head 159 of the arbor bolt such that the under side of the head bears against the annular end wall of the counterbore. A screw slot 166 in head 159 affords means for rotating the threaded arbor bolt with respect to the pivot pin such that the clamping pressure of the cam assembly may be altered.

Oppositely extending pivot pin portions 152A, 152B seat cover restraining rods 168, 169, respectively. The restraining rods may be threaded or press-fitted into radial holes in the pin portions. Each rod extends into a cover aperture 171 shown in dotted lines in FIG. 9 within a cover rim projection 172. Compression springs 174, 175 each surround a rod between the bottom surface of the projection and the pivot pin.

As seen in FIG. 10, means for restraining relative motion between the cam and the cam arbor comprises a spring pin 181, such as a piece of piano wire, and a flat 182 located on the periphery of the cam arbor. The pin is anchored within spaced holes 183, 184 in the yoke 185 that connects cam lobes 186, 187. The pin bridges the wall 188 of the undercut in the yoke whose purpose is to provide clearance for rotation.

The location of the flat with respect to the axis of the arbor bolt is such that the pin is under greatest tension when the cam is in locked position. A force opposing cam rotation of a minimum of five pounds has been found effective in preventing accidental opening of the quick-opening cam in situations where the pressure vessel is moved violently.

The embodiment of FIGS. 9 and 10 is operated similarly to the embodiments previously described. Clamping pressure is adjusted by rotation of arbor bolt 153 after a locking screw 191 in the pivot pin is disengaged from the threaded portion of the arbor bolt. The clamping tension is infinitely variable since the arbor bolt may be turned a greater or lesser amount to adjust the pressure. When the clamping assembly is opened, or moved from bearing contact with the cover, the clamp assembly is swung outwardly about the pivot pin axis by means of handle 193. Restraining rods 168, 169 cause the cover to be moved in an arc along with the clamp assembly. Compression springs 175 raise the cover and its gasket out of engagement with the pressure vessel opening so that the cover is free to swing.

FIG. 11 illustrates a clamping cam assembly 201 that comprises a cam arbor 202 threadably engaged with an arbor bolt 203 whose opposite end may be adjustably engaged with a pivot pin and mount assembly not shown. The clamp assembly has spaced cam lobes 205, 206 which are free to revolve about the cam arbor. A handle receptacle 208 within a yoke 209 provides means for rotating or revolving the cam lobes.

A detent boss 211 projects from one side of the yoke adjacent the lesser projection of the cam lobe periphery. A radial bore 212 in the boss opens into arbor-retaining cavity 213 of the cam. The bore houses a detent ball 214 and a compression spring 215. The spring is compressed between a retaining pin 217 and the detent ball. The spring urges the ball into contact with the adjacent periphery of the cam arbor. A detent recess 218 in the cam arbor periphery is located such that the ball registers therein when the cam lobes are in clamping orientation upon the pressure vessel cover. The spring pressure is such that accidental revolution of the cam lobes and yoke about the cam arbor when in clamping orientation is inhibited.

In FIG. 12 an alternate embodiment of the invention is fragmentarily shown particularly adapted to safe removal of covers from pressure vessels. In the FIGURE a pressure vessel 221 is sealed by a cover 222. The cover has an apertured rim 223 through which a plurality of cam arbor bolts, such as the bolt 224, extend upwardly. Each arbor bolt is pivotally secured by a clevis end 225 to a pivot pin 226 held to the pressure vessel wall by an ear 227. The arbor blot has a threaded portion 228 which engages threadably and adjustably in a cam arbor 229. Clamping cam assembly 231, including cam lobes 232, 233 and a yoke 234 is rotatably mounted on the cam arbor.

Downwardly protruding lips, such as the lip 236, may be integraly formed with the cover rim on each side of an aperture in the rim. A restraining colar 237 is threadably engaged upon the arbor bolt betwen the pivot pin and the cam assembly. The restraining collar has diametrically opposed upward projections, such as the projection 239, each adapted to engage a restraining lip 236 when the cam assembly and arbor bolt are loosened and pivoted away from the pressure vessel about pin 226.

The embodiment of FIG. 12 precludes total displacement of the cam assembly from restraining contact with the cover until the cover has been lifted sufficiently from the vessel opening to insure total drop of internal pressures. There is therefore no danger of a suddenly loosed cover being violently forced from the vessel by confined internal pressure.

While the restraining projections are preferably secured to the arbor bolt by a threaded collar for ease in adjustment, lugs (not shown) may be welded to the arbor bolt to perform th same function.

The perferred embodiment of the invention shown in FIGS. 3–6 offers substantial advantages, both in operation and fabricating costs when compared to the conventional clamping mechanisms. The clamping pressure is infinitely variable and the combination of the arbor bolt with the cover restraining rod not only acts as a hinge for the cover, but stabilizes the cover such that it is in position for sealing when swung back against the pressure vessel opening.

The inventive concept embodied in the apparatus disclosed is applicable beyond the specific uses illustrated. All of the embodiments afford utility heretofore not found in conventional mechanisms and each embodiment has particular advantages steming from the particular application of the inventive principles disclosed herein. Other variations within the scope of the invention will occur to those skilled in the art. Therefore, I desire the foregoing description to be regarded as illustrative only, relying upon the appended claims to define the invention.

I claim:

1. An adjustable cam clamp for clamping a workpiece to a work rest and comprising a threaded arbor bolt, means pivotally securing the threaded arbor bolt to the work rest, a cam arbor secured to the threaded arbor bolt, a clamping cam journalled on the cam arbor and adapted to bear against and urge the workpiece into clamping relationship with the work rest, handle means adapted to turn the clamping cam about the cam arbor, means for relative rotation between the cam arbor and the threaded arbor bolt such that the cam arbor is displaced relative to the means securing the arbor bolt to the work rest, said securing means adapting the threaded arbor bolt to arcuate motion toward and away from the work rest, and workpiece restraining means connecting between the workpiece and the securing means such that the workpiece hinges away from the work rest in association with the threaded arbor bolt.

2. Apparatus in accordance with claim 1 wherein the workpiece comprises a pressure vessel cover having an aperture at its rim adapted to receive an arbor bolt; and wherein the work rest comprises a pressure vessel having an opening adapted to be sealed by the cover.

3. Apparatus in accordance with claim 1 wherein the workpiece comprises a clamp strap adapted to bear against a sheet of work material; said clamp strap having a contact surface adapted to be impinged upon by the clamping cam.

4. An adjustable cam clamp for clamping a workpiece to a work rest and comprising an arbor bolt, first and second oppositely threaded ends on the arbor bolt, means securing the threaded arbor bolt at one of its ends to the work rest, a cam arbor adjustably secured to the other threaded end of the arbor bolt, a clamping cam journalled on the cam arbor and adapted to urge the workpiece into clamping relationship with the work rest, handle means adapted to turn the clamping cam about the cam arbor, means for turning the arbor bolt with respect to the cam arbor and securing means such that the cam arbor is displaced relative to the means securing the threaded arbor bolt to the work rest, said securing means adapting the arbor bolt to arcuate motion toward and away from the workpiece, and workpiece restraining means connecting between the workpiece and the securing means such that the workpiece hinges away from the work rest in association with the threaded arbor bolt and the cam arbor and the clamping cam.

5. Apparatus in accordance with claim 4 wherein the workpiece comprises a pressure vessel cover having an aperture at its rim adapted to receive an arbor bolt; and wherein the work rest comprises a pressure vessel having an opening adapted to be sealed by the cover.

6. Apparatus in accordance with claim 4 wherein the workpiece comprises a clamp strap adapted to bear against a sheet of work material; said clamp strap having a contact surface adapted to be impinged upon by the clamping cam.

7. In a pressure vessel having walls and a wall opening and a cover adapted to seal the opening, the combination comprising a plurality of clamp bearing surfaces spaced about the cover periphery, an aperture adjacent each bearing surface, an arbor bolt adapted to extend through the aperture when the cover is in sealing relationship covering the opening, an arbor bolt pivot pin pivotally mounted to a wall of the pressure vessel adjacent each aperture, the arbor bolt and the pivot pin being engaged such that the arbor bolt extends perpendicularly to the axis of rotation of the pivot pin, a cam arbor engaged with the arbor bolt remote from the pivot pin, a clamping cam mounted to the cam arbor and adapted to rotate about that cam arbor axis perpendicular to the arbor bolt, cam handle means, means associated with the cam arbor and the clamping cam resisting rotation of the cam on the arbor, the clamping cam and arbor being revolvable in an arc about the axis of the arbor bolt pin such that the clamping cam and the arbor bolt may be displaced from the aperture in the cover and the vessel opening, and cover-restraining means on one arbor bolt pivot pin such that the cover hinges away from the opening in association with the respective arbor bolt and clamping cam.

8. Apparatus in accordance with claim 7 wherein each arbor bolt comprises a threaded end adjustably engaged with the respective pivot pin, a shank end rotatably engaged with the respective cam arbor, and means on an end of the bolt adapted to rotate the bolt so as to effect a relative displacement of the pivot pin and the cam arbor.

9. Apparatus in accordance with claim 7 wherein each arbor bolt comprises a first threaded end adjustably engaged with the respective pivot pin, a second threaded end adjustably engaged with the respective cam arbor, and means on an end of the bolt adapted to rotate the bolt so as to effect a relative displacement of the pivot pin and the cam arbor, said threaded ends being of opposite hand.

10. Apparatus in accordance with claim 7 wherein each arbor bolt comprises a threaded end and an eye loop end, one end being engaged with the respective pivot pin, and the other end being engaged with the respective cam arbor, and means adapted to rotate the arbor bolt so as to effect a relative displacement of the pivot pin and the cam arbor.

11. Apparatus in accordance with claim 7 further comprising detent means on the cam arbor and clamping cam resisting rotation of the clamping cam with respect to the cam arbor.

12. In a pressure vessel having walls and a wall opening and a cover adapted to seal the opening, the combination comprising a plurality of clamp bearing surfaces spaced about the cover periphery, a vertical wall defining an aperture adjacent each bearing surface, an arbor bolt adapted to extend on obverse and reverse sides of the cover through each aperture when the cover is in sealing relationship covering the opening, an arbor bolt pivot pin pivotally mounted to a wall of the pressure vessel adjacent each aperture, a first and a second threaded portion of opposite hands on each arbor bolt, the first portion of the arbor bolt and the pivot pin being adjustably threadably engaged such that the arbor bolt extends perpendicularly to the axis of rotation of the pivot pin, a cam arbor adjustably threadably engaged with the second portion of the arbor bolt, a clamping cam rotatably mounted to the cam arbor and adapted to rotate about an axis perpendicular to the arbor bolt, means associated with the cam arbor and the clamping cam resisting rotation of the cam about the arbor, handle means adapted to revolve the cam, the clamping cam and arbor being revolvable in an arc about the axis of the arbor bolt pivot pin such that the clamping cam and the arbor bolt may be displaced from the aperture in the cover and the vessel opening, and cover-restraining means on one arbor bolt pivot pin such that the cover hinges away from the opening in association with the respective arbor bolt and clamping cam.

13. Adjustable clamping apparatus for use with a pressure vessel having a wall and an opening through the wall and a cover with an apertured rim, the apparatus comprising a plurality of pivot mounts on the vessel wall adapted to align one with each rim aperture when the cover is in sealing relationship to the vessel opening, an arbor bolt pivot pin held in each pivot mount, a plurality of arbor bolts, a first and a second threaded portion of opposite hands on each arbor bolt, the first portion of each arbor bolt being adjustably and threadably engaged in a pivot pin so that the arbor bolt extends perpendicularly to the pivot axis of the pivot pin, a cam arbor threadably and adjustably engaged with the second threaded portion of each arbor bolt, means for turning the arbor bolt with respect to the pivot pin and cam arbor to effectuate relative displacement of the cam arbor and the arbor bolt pivot pin, a clamping cam on each cam arbor adapted to rotate thereon about an axis perpendicular to the arbor bolt, and handle means for rotating each clamping cam with respect to the axis of its respective arbor into clamping engagement with a surface of the vessel cover when the cover is in sealing relationship to the opening.

14. Apparatus in accordance with claim 13 further comprising detent means on the cam arbor and clamping cam resisting rotation of the cam with respect to the arbor.

15. Apparatus in accordance with claim 13 further comprising an inner wall on the clamping cam, detent means on the cam arbor and clamping cam adjacent the inner wall resisting rotation of the clamping cam with respect to the cam arbor.

16. Apparatus in accordance with claim 15 wherein the detent means comprises a detent ball and a spring residing in a chamber within the cam arbor, and a detent recess in the inner wall of the clamping cam, said spring urging said ball toward engagement with said detent recess when the arbor and cam are in clamping relationship.

17. Adjustable clamping apparatus for use with a pressure vessel having a wall and an opening through the wall and a cover with an apertured rim, the apparatus comprising a plurality of pivot mounts on the vessel wall adapted to align one with each rim aperture when the cover is in sealing relationship to the vessel openig, an arbor bolt pivot pin held by each pivot mount, a plurality of arbor bolts, a threaded portion on each arbor bolt, the bolt end opposite the threaded portion of each arbor bolt being engaged by a pivot pin so that the arbor bolt extends perpendicularly to the pivot axis of the pivot pin, a cam arbor threadably and adjustably engaged with the threaded portion of each arbor bolt, means for turning the cam arbor with respect to the arbor bolt to effect relative displacement of the cam arbor and the arbor bolt pivot pin, a clamping cam on each cam arbor adapted to rotate thereon about an axis perpendicular to the arbor bolt, handle means for rotating each clamping cam with respect to the axis of its respective cam arbor into clamping engagement with the vessel cover when the cover is in sealing relationship to the opening, a rim lip adjacent a rim aperture, and restraining means on the arbor bolt adapted to engage the rim lip when the arbor bolt is pivoted away from the vessel with the cover in contact with the vessel opening.

18. Apparatus in accordance with claim 17 wherein the restraining means comprises an internally threaded collar engaged with the arbor bolt intermediate the pivot pin and the clamping cam, and rim lip engaging protuberances on the collar adapted to engage the lip when the arbor bolt is swung away from the vessel about the arbor bolt pivot pin.

No references cited.

THERON L. CONDON, *Primary Examiner.*

G. T. HALL, *Assistant Examiner.*